(12) United States Patent
Joret et al.

(10) Patent No.: US 6,924,037 B1
(45) Date of Patent: Aug. 2, 2005

(54) TRANSPARENT SUBSTRATE COMPRISING AN ANTIGLARE COATING

(75) Inventors: Laurent Joret, Paris (FR); Anne Durandeau, Paris (FR); Norbert Huhn, Herzogenrath (DE); Olaf Stahlschmidt, Aachen (DE); Ulrich Billert, Aachen (DE)

(73) Assignee: Saint-Gobain Glass France, Courbevoie (FR)

(*) Notice: Subject to any disclaimer, the term of this patent is extended or adjusted under 35 U.S.C. 154(b) by 36 days.

(21) Appl. No.: 10/088,089

(22) PCT Filed: Nov. 17, 2000

(86) PCT No.: PCT/FR00/03209
§ 371 (c)(1),
(2), (4) Date: Aug. 7, 2002

(87) PCT Pub. No.: WO01/37006
PCT Pub. Date: May 25, 2001

(30) Foreign Application Priority Data
Nov. 17, 1999 (FR) .......................................... 99 14423

(51) Int. Cl.⁷ ................................................ B32B 9/00
(52) U.S. Cl. .................... 428/432; 428/697; 428/698; 428/699; 428/701; 428/702
(58) Field of Search .......................... 428/411.1, 426, 428/432, 446, 618, 687, 697, 698, 699, 701, 702, 913; 359/580, 586, 588, 589, 609

(56) References Cited

U.S. PATENT DOCUMENTS

| 5,891,556 A | | 4/1999 | Anderson |
| 5,939,201 A | | 8/1999 | Boire et al. |
| 6,068,914 A | * | 5/2000 | Boire et al. .................. 428/216 |

FOREIGN PATENT DOCUMENTS

| EP | 0 515 847 | 12/1992 |
| FR | 2 713 624 | 6/1995 |
| JP | 60 050022 | 3/1985 |
| WO | 97 43224 | 11/1997 |

\* cited by examiner

Primary Examiner—Deborah Jones
Assistant Examiner—G. Blackwell-Rudasill
(74) Attorney, Agent, or Firm—Oblon, Spivak, McClelland, Maier & Neustadt, P.C.

(57) ABSTRACT

A transparent substrate including an antireflection coating, made from a stack of thin layers of dielectric material having alternately high and low refractive indices. This stack includes a high-index first layer having a refractive index n, of between 1.8 and 2.2 and a geometrical thickness $e_1$ of between 5 and 50 nm, a low-index second layer having a refractive index $n_2$ of between 1.35 and 1.65 and a geometrical thickness $e_2$ of between 5 and 50 nm, a high-index third layer having a refractive index $n_3$ of between 1.8 and 2.2 and a geometrical thickness $e_3$ of between 70 and 120 nm, and a low-index fourth layer having a refractive index $n_4$ of between 1.35 and 1:65 and a geometrical thickness $e_4$ of at least 80 nm.

37 Claims, 1 Drawing Sheet

TRANSPARENT SUBSTRATE COMPRISING AN ANTIGLARE COATING

Figure 1:
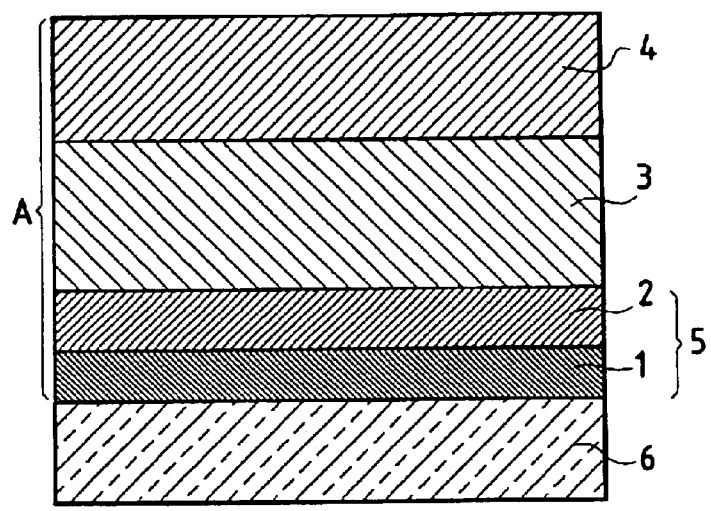

The invention relates to a transparent substrate, especially made of glass, intended to be incorporated into glazing and provided, on at least one of its faces, with an antireflection coating.

An antireflection coating usually consists of a stack of interferential thin layers, generally an alternation of layers based on a dielectric material having high and low refractive indices. The purpose of such a coating, deposited on a transparent substrate, is to reduce its light reflection, and therefore to increase its light transmission. A substrate coated in this way therefore has its transmitted light/reflected light ratio increased, thereby improving the visibility of objects placed behind it. When it is desired to achieve the maximum antireflection effect, it is then preferable to provide both faces of the substrate with this type of coating.

There are many applications of this type of product: it may serve for glazing in buildings, for example as a shop display cabinet and as architectural curved glass, so as to more clearly distinguish what is displayed in the window, even when the internal lighting is low compared with the external lighting. It may also serve as glass for a counter.

An application in the fitting-out of vehicles has also been envisaged, especially for cars and trains. Giving a windscreen an antireflection effect is particularly advantageous on several counts: it can increase the light transmission into the passenger compartment, and therefore increase the visual comfort of the passengers. It also makes it possible to eliminate the undesirable reflections which annoy the driver, particularly reflections of the dashboard.

Examples of antireflection coatings are described in patents EP 0 728 712 and WO 97/43224.

However, whether referring to display cabinets, counter glass or windscreens, the glazing involved, once fitted, is not necessarily in a vertical position unlike conventional glazing in buildings, for example curtain walling. Windscreens are usually inclined at about 60°, while shop windows and counters are often curved with variable angles of observation.

Now, most antireflection coatings developed hitherto have been optimized to minimize light reflection at normal incidence, without taking into account the optical appearance of the glazing viewed obliquely. Thus, it is known that at normal incidence it is possible to obtain very low light reflection values $R_L$ with stacks consisting of four layers with a high-index layer/low-index layer/high-index layer/low-index layer alternation. The high-index layers are generally made of $TiO_2$, which actually has a very high index of about 2.45, and the low-index layers are usually made of $SiO_2$. The optical thicknesses of the layers (their geometrical thickness multiplied by their refractive index) are expressed successively in the following manner: $(e1+e2)<\lambda/4-e3\geq\lambda/2-e4=\lambda/4$, where $\lambda$ is the wavelength averaged over the visible range around 500 nm and e1 to e4 are the thicknesses of the four layers deposited in succession on the substrate. The coating may also comprise a three-layer stack. In this case, it is preferable that the optical thicknesses e'1, e'2 and e'3 of the layers in the order in which they are deposited on the substrate satisfy the following conditions: $\lambda/4-\lambda/2-\lambda/4$.

However, the appearance in reflection, especially the intensity of the light reflection, is not satisfactory when the viewing angle moves slightly away from perpendicular to the glazing.

Studies have been conducted in order to take into account an oblique viewing angle, but these have not been completely satisfactory either: mention may be made, for example, of patent EP-0 515 847 which proposes a two-layer stack of the $TiO_2+SiO_2/SiO_2$ type or a three-layer stack of the $TiO_2+SiO_2/TiO_2/SiO_2$ type deposited by sol-gel, but this stack is not as efficient.

The object of the invention is therefore to remedy the abovementioned drawbacks, by seeking to develop an antireflection coating which can reduce the level of light reflection from a transparent substrate of the glass type over a wider angle-of-incidence range, and more particularly at an oblique angle of incidence ranging from 50 to 70° with respect to the vertical, and this being achieved without compromising the economic and/or industrial feasibility of its manufacture. Secondarily, the subject of the invention is the development of such a coating which is furthermore capable of withstanding heat treatments, especially if the carrier substrate is a glass which, in its final application, must be annealed, bent or toughened.

The subject of the invention is first of all a transparent substrate, especially made of glass, comprising, on at least one of its faces, an antireflection coating consisting of thin layers of dielectric material having alternately high and low refractive indices, especially creating an antireflection effect at oblique incidence, the said substrate being defined as follows. It comprises, in succession:

- a high-index first layer 1, having a refractive index $n_1$ of between 1.8 and 2.2 and having a geometrical thickness $e_1$ of between 5 and 50 nm;
- a low-index second layer 2, having a refractive index $n_2$ of between 1.35 and 1.65 and a geometrical thickness $e_2$ of between 5 and 50 nm;
- a high-index third layer 3, having a refractive index $n_3$ of between 1.8 and 2.2 and a geometrical thickness $e_3$ of between 70 and 120 nm;
- a low-index fourth layer 4, having a refractive index $n_4$ of between 1.35 and 1.65 and a geometrical thickness $e_4$ of at least 80 nm.

Within the meaning of the invention, the term "layer" is understood to mean either a single layer or a superposition of layers in which each of them complies with the refractive index indicated and in which the sum of their geometrical thicknesses again remains equal to the value indicated for the layer in question.

Within the meaning of the invention, the layers are made of a dielectric material, especially of the oxide or nitride type, as will be explained in detail below. However, this does not exclude at least one of them being modified so as to be at least slightly conducting, for example by doping it with a metal oxide, so as, for example, to also give the antireflection stack an antistatic function.

The invention preferably applies to glass substrates, but it also applies to transparent substrates based on a polymer, for example polycarbonate.

The invention therefore relates to an antireflection stack of the four-layer type. This is a good compromise as the number of layers is large enough for their interferential interaction to make it possible to achieve a large antireflection effect. However, this number remains sufficiently reasonable for the product to be able to be manufactured on a large scale, on an industrial line, on large substrates.

The thickness and refractive-index criteria adopted in the invention make it possible to obtain an antireflection effect over a broad band of low light reflection, even at high angles of incidence such as 50 to 70°, something which is exceptional (this does not prevent, of course, the antireflection stacks of the invention from also reducing the light reflection at normal incidence).

It has proved difficult to select these criteria, since the inventors have taken into account the industrial feasibility of the product and the appearance in light reflection at two levels: both wishing to minimize the value of the light reflection $R_L$ at oblique incidence itself but also wishing to obtain, for this oblique light reflection, a satisfactory calorimetric response, that is to say a colour in reflection whose tint and intensity are acceptable from the aesthetic standpoint.

The inventors have succeeded in this, especially by lowering the value of $R_L$ by at least 3 or 4% between 50° and 70° under illuminant $D_{65}$, and preferably obtaining negative values of a* and b* in the (L, a*, b*) colorimetry system for this same light reflection. This results in a significant reduction in reflections and a colour in the blue-greens in reflection, which is currently judged to be aesthetically attractive in many applications, especially in the automobile industry.

Perhaps the two most striking characteristics of the invention are the following:
  firstly, compared with a standard four-layer antireflection coating, the thickness of the last, low-index, layer has been significantly increased: its preferred thickness is greater than the value of $\lambda 4$ normally used;
  secondly, it has been discovered that, unlike the choice usually made for the high-index layers, it was unnecessary, and even disadvantageous, to choose materials having a very high index, such as $TiO_2$. On the contrary, for these layers it has proved more judicious to use materials having a more moderate refractive index, especially of at most 2.2. This therefore goes counter to the known teaching on antireflection stacks in general.

The inventors have thus exploited the fact that, at oblique incidence, the low-reflection spectrum broadens and that it is thus possible to be able to use materials whose index is around 2, such as tin oxide $SnO_2$ or silicon nitride $Si_3N_4$. Especially as compared with $TiO_2$, these materials have the advantage of being able to be deposited at much higher rates when the deposition technique called sputtering is used. Within this moderate range of indices, there is also a greater choice of materials that can be deposited by sputtering, which offers greater flexibility in industrial manufacture and more options for adding further functionalities to the stack, as will be explained in detail below.

These "moderate"-index materials also offer greater flexibility from the strictly optical standpoint: it has been discovered that they allow finer adjustment of the "pair" of values defining most specifically the light reflection (layer side) from the substrate, namely on the one hand the light reflection value $R_L$ and, on the other hand, the a* and b* values corresponding to it at oblique incidence (as will become apparent from the detailed examples below; it is in fact possible to favour one or other of these two values depending on the intended objective or application more).

They also enable the stack to be made overall optically less sensitive, especially from the calorimetric standpoint, to the thickness variations of the layers in the stack and to the variations in the angles of incidence at which the glasses are observed.

Given below are the preferred ranges of the geometrical thicknesses and of the indices of the four layers of the stack according to the invention:
  a for the first and/or third layer, those with a high index:
    $n_1$ and/or $n_3$ are advantageously between 1.85 and 2.15, especially between 1.90 and 2.10,
    $e_1$ is advantageously between 5 and 50 nm, especially between 10 and 30 nm or between 15 and 25 nm,
    $e_3$ is advantageously less than or equal to 120 nm or less than or equal to 110 nm, and is especially at least 75 nm;
  the second and/or fourth layer, those with a low index:
    $n_2$ and/or $n_4$ are advantageously between 1.35 (or 1.40) and 1.55,
    $e_2$ is advantageously between 5 and 50 nm, and is especially less than or equal to 35 nm or less than or equal to 30 nm, especially being between 10 and 35 nm,
    $e_4$ is advantageously greater than or equal to 90 or 80 nm, and is especially less than or equal to 120 or 110 nm.

According to an alternative embodiment of the invention, the high-index first layer 1 and the low-index second layer 2 may, be replaced with a single layer 5 having a so-called "intermediate" refractive index ns, especially one between 1.65 and 1.80, and preferably having an optical thickness $e_{opt.5}$ of between 50 and 140 nm (preferably from 85 to 120 nm). In conventional three-layer antireflection stacks, optimized for perpendicular viewing, this thickness is somewhat above 120 nm. This intermediate-index layer has an optical effect similar to that of a high-index layer/low-index layer sequence when it forms the first sequence, i.e. the two layers closest to the substrate bearing the stack. It has the advantage of reducing the overall number of layers in the stack. It is preferably based on a mixture of, on the one hand, silicon oxide and, on the other hand, at least one metal oxide chosen from tin oxide, zinc oxide and titanium oxide. It may also be based on silicon oxynitride or oxycarbide and/or based on aluminium oxynitride.

The materials most suitable for forming the first and/or the third layer, those having a high index, are based on one or more metal oxides chosen from zinc oxide ZnO, tin oxide $SnO_2$ and zirconium oxide $ZrO_2$. They may also be based on one or more nitrides chosen from silicon nitride $Si_3N_4$ and aluminium nitride AlN.

Using a nitride layer for one or other of the high-index layers, especially the third layer at least, makes it possible to add a functionality to the stack, namely an ability to better withstand the heat treatments without any appreciable impairment in its optical properties. Now, such a functionality is important in the case of glazing of the windscreen or shop counter type, since the glazing has to undergo high-temperature heat treatments of the bending, toughening, annealing or laminating type, in which the glasses have to be heated to at least 120° C. (for laminating) up to 500 to 700° C. (for bending and toughening). It then becomes paramount to be able to deposit the thin layers before the heat treatment without this causing a problem (to deposit layers on bent glass is tricky and expensive, and it is much simpler from the industrial standpoint to carry out the deposition before any heat treatment).

It is thus possible to have a single configuration of antireflection stack whether or not the carrier glass is intended to undergo a heat treatment.

Even if it is not intended to be heated, it is still beneficial to use at least one nitride layer as this improves the mechanical and chemical durability of the stack in its entirety.

According to one particular embodiment, the first and/or third layer, those having a high index, may in fact be formed from several superposed high-index layers. Most particularly, they may form a bilayer of the $SnO_2/Si_3N_4$ or $Si_3N_4/SnO_2$ type. This has the following advantage: the $Si_3N_4$ tends to be deposited a little less easily and a little more slowly by reactive sputtering than a conventional metal oxide such as $SnO_2$, ZnO or $ZrO_2$. Especially for the third layer, which is the thickest and most important for protecting the stack from any damage resulting from a heat treatment, it may be beneficial to duplicate the layer so as to just bring the $Si_3N_4$ thickness sufficient to obtain the effect of protection against the desired heat treatments and to optically "supplement" the layer with $SnO_2$ or ZnO.

The most appropriate materials for forming the second and/or the fourth layer, those having a low index, are based on silicon oxide, silicon oxynitride and/or oxycarbide or else based on a mixed silicon aluminium oxide. Such a mixed oxide tends to have better durability, especially chemical durability, than pure $SiO_2$ (an example of this is given in patent EP-791 562). The respective proportions of the two oxides may be adjusted in order to improve the expected durability without excessively increasing the refractive index of the layer.

The glass chosen for the substrate coated with the stack according to the invention or for the other substrates which are associated with it in order to form a glazing assembly, may in particular be, for example, extra clear of the "Diamant" type or clear of the "Planilux" type or tinted glass of the "Parsol" type, these three products being sold by Saint-Gobain Vitrage, or else may be of the "TSA" or "TSA++" type as described in patent EP 616 883. It may also be an optionally tinted glass as described in patents WO 94/14716, WO 96/00194, EP 0 644 164 or WO 96/28394. It may act as a filter against ultraviolet-type radiation.

The substrate or substrates may have undergone heat treatments, that the antireflection stack according to the invention is capable of withstanding, such as annealing, toughening, bending or even folding, that is to say bending with a very small radius of curvature (application in particular for shop counters and windows), most particularly when at least the high-index third layer of the stack contains silicon nitride or aluminium nitride. This means that such heat treatments have no or virtually no effect on the mechanical and chemical durability of the stack and do not modify (or only very slightly modify) its optical properties.

The subject of the invention is also glazing incorporating the substrates provided with the multilayer stack defined above. The glazing in question may be "monolithic", that is to say composed of a single substrate coated with the multilayer stack on one of its faces. Its opposite face may be devoid of any antireflection coating, being bare or covered with a coating having another functionality. This may be a coating having a solar-protection function (using, for example, one or more silver layers surrounded by dielectric layers, or layers of nitrides such as TiN or ZrN or of metal oxides or of steel or of an Ni—Cr alloy), having a low-emissivity function (for example one made of a doped metal oxide, such as $F:SnO_2$ or tin-doped indium oxide ITO or one or more silver layers), having an antistatic function (an oxygen-substoichiometric or doped metal oxide), a heating layer (a Cu- or Ag-doped metal oxide, for example) or an array of heating wires (copper wires or bands screen-printed using a conducting silver paste), an antifogging function (using a hydrophilic layer), an anti-rain function (using a hydrophobic layer, for example one based on a fluoropolymer) or an antifouling function (a photocatalytic coating comprising at least partially crystallized $TiO_2$ in the anatase form).

The said opposite face may also be provided with an antireflection stack to maximize the desired antireflection effect. In this case, this may also be an antireflection stack meeting the criteria of the present invention or it may be another type (B) of antireflection coating.

One particularly beneficial glazing assembly incorporating a substrate coated according to the invention has a laminated structure, which consists of two glass substrates joined together by one or more sheets of a thermoplastic such as polyvinyl butyral PVB. In this case, one of the two substrates is provided, on the external face (the face opposite that where the glass joins the thermoplastic sheet), with the antireflection stack (A) according to the invention. The other glass, also on its external face, may, as previously, be bare, coated with layers having another functionality, coated with the same antireflection stack (A) or with another type (B) of antireflection stack, or else with a coating having another functionality as in the previous case (this other coating may also be placed not on a face opposite the join but on one of the faces of one of the rigid substrates which points towards the side with the thermoplastic joining sheet). Conventionally, the faces of the glazing are numbered starting from the outermost face. Thus, it is possible to have the antireflection stack according to the invention on the 1 and/or 4 faces (that is to say on the face of the glass panes pointing towards the outside of the glazing, when there are two glass panes).

It is therefore possible to provide the laminated glazing with an array of heating wires, with a heating layer or with a solar-protection coating on the "inside" of the laminate (and therefore on the 2 and/or 3 faces). Solar-protection coatings based on two silver layers sandwiched between three layers or multilayers made of particularly appropriate dielectric material are described in patents EP 638 528, EP 718 250, EP 844 219 and EP 847 965.

According to another alternative embodiment, instead of depositing the solar-protection coating on one of the rigid substrates (one of the glass panes), it is possible to deposit it on a sheet of polymer of the PET (polyethylene terephthalate) type, which is placed between two sheets of thermoplastic polymer of the PVB type before being laminated with the two glass panes. This type of configuration is especially described in patents EP 758 583, U.S. Pat. No. 5,932,329, EP 839 644, WO 99/45415 and EP 1 010 677.

An antifouling layer (for example based on photocatalytic $TiO_2$ as described in patents WO 97/10186, WO 97/10185 or WO 99/44954), or else a hydrophilic or hydrophobic layer may be placed on the "outside" (and therefore on the 1 or 4 faces, on the face not covered with the antireflection stack according to the invention).

It is thus possible to have configurations of the type:
antireflection coating (A)/glass/PVB/bare or anti-fouling, hydrophilic or hydrophobic functionalized glass;
antireflection coating (A)/glass/PVB/glass/antireflection coating (A) or (B);
antireflection coating (A)/glass/PVB/PET provided on one of its faces with a solar-protection coating/PVB/glass/optional antireflection coating (A) or (B); antireflection coating (A)/glass/PVB/solar-protection coating/glass/optional antireflection coating (A) or (B);
antireflection coating (A)/glass/solar-protection coating/PVB/glass/optional antireflection coating (A) or (B).

These configurations, especially with both substrates bent and/or toughened, make it possible to obtain motor-vehicle glazing, and especially a highly advantageous windscreen since the standards impose, on motor vehicles, windscreens with a high light transmission, of at least 75% at normal incidence according to the European standards. By incorporating antireflection coatings in the usual windscreen laminated structure, the light transmission of the glazing is increased, for example by at least 6%, this being advantageous as it allows more light into the passenger compartment of the vehicle, providing better comfort and safety. In another use, the reduction in light reflection may serve to reduce the energy transmission while still complying with the standards in terms of light transmission. Thus, it is possible to increase the solar-protection effect of the windscreen, for example by absorption in the glass substrates, using glass substrates that are tinted more strongly. Specifically, it is thus possible to make the light reflection value of a standard laminated windscreen go from 13.6% to less than 6.5%, while still reducing its energy transmission by at least 7%, taking it for example from 48.5% to 41.5%, with a constant light transmission of 75%.

Various objectives may be achieved by choosing another antireflection coating, of the (B) type, for the other face of the glazing (whether this is monolithic or laminated). It may be desirable for the second coating to be even simpler to manufacture and for it therefore to have a smaller number of layers. It may also be beneficial to differentiate the required level of durability for the two coatings according to their degree of exposure to mechanical or chemical assault. Thus, for glazing fitted into a vehicle, it may be judicious to provide the external face of the glazing with a more durable coating, even if optically it is less efficient, than the inner face turned towards the passenger compartment (the reader need only think, for example, of the repeated mechanical assault by the windscreen wiper blades).

The invention also includes glazing provided with the antireflection stack of the invention and in the form of multiple glazing, that is to say using at least two substrates separated by an intermediate gas-filled cavity (double or triple glazing). Here again, the other faces of the glazing may also be antireflection-treated or may have another functionality.

It should be noted that this other functionality may also consist in placing, on the same face, the antireflection stack and the stack having another functionality (for example by surmounting the antireflection coating with a very thin antifouling coating layer).

Greater durability may be obtained by reducing the number of layers, or even keeping only one of them, in order to minimize the internal stresses in the stack and the risks of delamination, and/or by tailoring the process of depositing the layers. It is known that hot deposition, using pyrolysis techniques for example, make it possible to obtain layers that are more adherent and stronger than those deposited cold, for example by sputtering.

This type-B antireflection coating may be chosen from one of the following coatings:

a single low-index layer, having a refractive index of less than 1.60 or 1.50, especially about 1.35 to 1.48. It is preferably an $SiO_2$ layer having a thickness of between 80 and 120 nm, which may be deposited by sol-gel, CVD, corona discharge or sputtering;

again only a single layer, but one whose refractive index varies through its thickness in order to improve the performance thereof. It may especially be a layer based on silicon oxynitride $SiO_xN_y$, where x and y vary through its thickness, or based on a mixed silicon titanium oxide $Si_zTi_{1-z}O_2$, where z varies through the thickness of the layer. This type of coating may be deposited by plasma CVD and is explained in detail in patent FR 98/16118 of 21 Dec. 1998;

a two-layer stack comprising, in succession, a layer having a high index of at least 1.8 (especially made of tin oxide $SnO_2$, zinc oxide ZnO, zirconium oxide $ZrO_2$, titanium oxide $TiO_2$, silicon nitride $Si_3N_4$ and/or aluminium nitride AlN) and then a layer having a low index of less than 1.65, especially made of silicon oxide, oxynitride or oxycarbide;

a three-layer stack comprising, in succession, a layer of medium index between 1.65 and 1.80, of the silicon oxycarbide or oxynitride and/or aluminium oxycarbide or oxynitride type, a layer having an index equal to or greater than 1.9, such as $SnO_2$, ZnO, $ZrO_2$, $Si_3N_4$ or $TiO_2$, and again a layer having a low index of less than 1.65, made of $SiO_2$ or a mixed silicon aluminium oxide (possibly fluorinated according to the aforementioned patent EP-791 562), as may be all the other mixed Si—Al oxide layers mentioned above).

The subject of the invention is also the process for manufacturing the glass substrates with an antireflection coating (A) according to the invention. A process consists in depositing all the layers, in succession, one after the other, by a vacuum technique, especially by magnetic-field-enhanced sputtering or by corona discharge. Thus, it is possible to deposit the oxide layers by reactive sputtering of the metal in question in the presence of oxygen and the nitride layers in the presence of nitrogen. To make $SiO_2$ or $Si_3N_4$, the process can start with a silicon target which is lightly doped with a metal such as aluminium in order to make it sufficiently conducting.

In the case of the optional antireflection coating B of another type, several deposition techniques are possible, those involving a heat treatment or those carried out cold, especially the sol-gel technique, pyrolysis techniques carried out in the pulverulent, solid or vapour phase, the latter also being known by the name CVD (Chemical Vapour Deposition). The CVD may be plasma-enhanced CVD. It is also possible to use vacuum techniques of the sputtering type.

The antireflection coating A may also be deposited hot. Preferably, the coating A is deposited by sputtering and the coating B by pyrolysis of the CVD type. It is also possible, as recommended by the aforementioned patent WO 97/43224, for some of the layers of one or other of the stacks to be deposited by a hot deposition technique of the CVD type, the rest of the stack being deposited cold by sputtering.

The subject of the invention is also applications of such glazing, most of which have already been mentioned: shop windows, display cabinets and counters, glazing for buildings, glazing for any land-, air- or sea-going vehicle, especially the windscreen of a vehicle, the rear window, sunroof, side windows or antidazzle screens, for any display device such as computer screens, televisions, any glass furniture or any decorative glass. Such glazing may be bent/toughened after the layers have been deposited.

Figure 2:
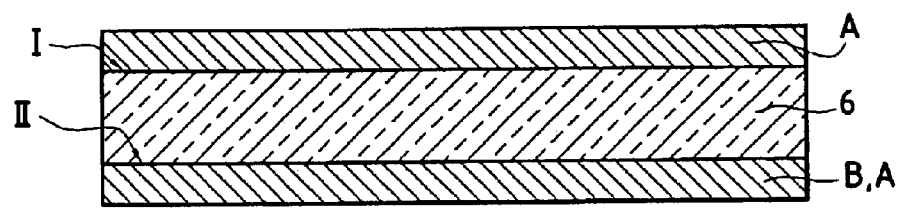
Figure 3:
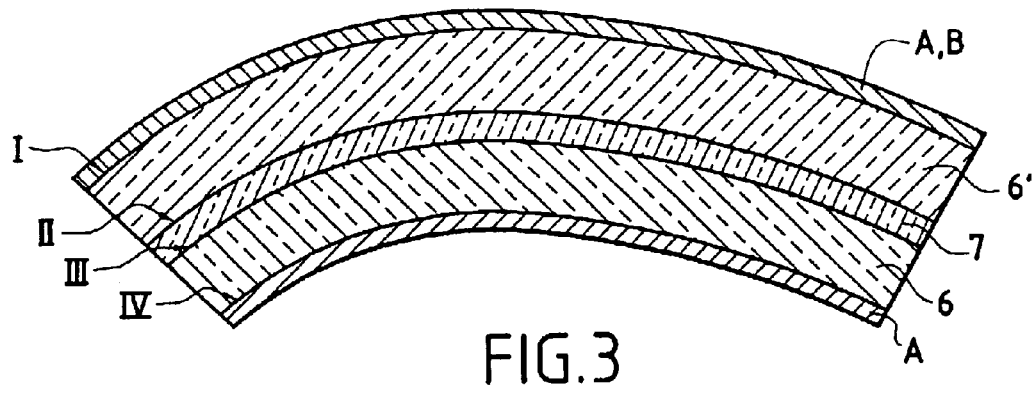

The details and advantageous characteristics of the invention will now be apparent from the following non-limiting examples, with the aid of the figures:

FIG. 1: a substrate provided with a four-layer antireflection stack A according to the invention;

FIG. 2: monolithic glazing provided with two antireflection stacks (A, A) or (A, B);

FIG. 3: laminated glazing provided with two antireflection stacks (A, A) or (A, B).

FIG. 1, which is highly schematic, shows in cross section a glass pane 6 surmounted by a four-layer antireflection stack (A).

FIG. 2, also highly schematic, shows monolithic glazing in cross section, with a glass pane (6) provided on each of its faces with an antireflection stack.

FIG. 3 shows laminated glazing in cross section, each of the external faces of which is antireflection-treated.

Examples 1 to 10 below are modelling results and Examples 11 to 15 were actually produced. All Examples 1 to 13 relate to four-layer antireflection stacks, while Example 14 relates to a three-layer antireflection coating. The layers were all deposited conventionally by reactive magnetic-field-enhanced sputtering in an oxidizing atmosphere using an Si or metal target to make the $SiO_2$ or metal oxide layers, using an Si or metal target in a nitriding atmosphere to make the nitrides and in a mixed oxidizing/nitriding atmosphere to make the oxynitrides. The Si targets may contain a small amount of another metal, especially Zr, Al, especially so as to make them more conducting.

EXAMPLES 1 to 10

For Examples 2–4 and 7 to 10a, the antireflection stack used was the following:

| (6): Glass | |
|---|---|
| (1): $SnO_2$ | index $n_1$ = 2 |
| (2): $SiO_2$ | index $n_2$ = 1.46 |
| (3): $SnO_2$ (or $Si_3N_4$) | index $n_3$ = 2 |
| (4): $SiO_2$ | index $n_4$ = 1.46. |

For Comparative Examples 5–6, the antireflection stack used was the following:

| (6): Glass | |
|---|---|
| (1): $SnO_2$ | index = 2 |
| (2): $SiO_2$ | index = 1.46 |
| (3): $TiO_2$ | index = 2.40 |
| (4): $SiO_2$ | index = 1.46. |

Examples 1 to 7 relate to monolithic glazing and Examples 8 to 10a relate to laminated glazing.

Example 1 (Comparative)

This is the glass pane 6 in FIG. 1, but without any coating. The glass is a clear silica-soda-lime glass 2 mm in thickness, sold under the name Planilux by Saint-Gobain Vitrage.

Example 2

This is the glass pane 6 in FIG. 1 provided on only one face with the antireflection stack.

The table below gives the index $n_1$ and the geometrical thickness $e_i$ in nanometers for each of the layers:

| EXAMPLE 2 | LAYER (1) | LAYER (2) | LAYER (3) | LAYER (4) |
|---|---|---|---|---|
| $n_i$ | 2.0 | 1.46 | 2.0 | 1.46 |
| $e_i$ | 15 nm | 35 nm | 90 nm | 105 nm |

The purpose of this example is to minimize as far as possible the $R_L$ value of the glass pane 6 (on the coated side) at an angle of incidence of 60°.

Example 3

This is the same glazing configuration as in Example 2, but the purpose being both to reduce the $R_L$ value on the side where the layers are and to obtain a colour in the blue-greens (negative a* and b*) in reflection, again at 60° incidence. The thicknesses have been adjusted differently:

| EXAMPLE 3 | LAYER (1) | LAYER (2) | LAYER (3) | LAYER (4) |
|---|---|---|---|---|
| $n_i$ | 2.0 | 1.46 | 2.0 | 1.46 |
| $e_i$ | 19 nm | 17 nm | 100 nm | 95 nm |

Example 4

Again we have the configuration of Examples 2 and 3, but here the motivation is to obtain the best possible compromise between the maximum reduction in $R_L$ at oblique incidence (60°) and the reduction in $R_L$ at normal incidence (0°):

Example 4

| EXAMPLE 4 | LAYER (1) | LAYER (2) | LAYER (3) | LAYER (4) |
|---|---|---|---|---|
| $n_i$ | 2.0 | 1.46 | 2.0 | 1.46 |
| $e_i$ | 20 nm | 35 nm | 80 nm | 105 nm |

Comparative Example 5

This example uses a layer 3 ($TiO_2$) having a significantly higher index than that recommended in the invention. The optical thickness of this layer 3 is chosen to be identical to that of the layer 3 of Example 2.

| EXAMPLE 5 | LAYER (1) | LAYER (2) | LAYER (3) | LAYER (4) |
|---|---|---|---|---|
| $n_i$ | 2.0 | 1.46 | 2.40 | 1.46 |
| $e_i$ | 15 nm | 35 nm | 75 nm | 105 nm |

Comparative Example 6

This example repeats the same sequence of layers as in Comparative Example 5, with the objective of minimizing the $R_L$ value on the multilayer side at oblique incidence (60°).

| EXAMPLE 6 | LAYER (1) | LAYER (2) | LAYER (3) | LAYER (4) |
|---|---|---|---|---|
| $n_i$ | 2.0 | 1.46 | 2.40 | 1.46 |
| $e_i$ | 25 nm | 35 nm | 110 nm | 105 nm |

Example 7

This example has the configuration of FIG. 2, namely a glass pane (6) coated on both its faces with the same antireflection stack A. The glass pane (6) is again made of clear Planilux glass 2 mm in thickness.

The objective here is to obtain a good compromise between reducing $R_L$ and obtaining an attractive colour in reflection, again at 60°.

| EXAMPLE 7 | LAYER (1) | LAYER (2) | LAYER (3) | LAYER (4) |
|---|---|---|---|---|
| $n_i$ | 2.0 | 1.46 | 2.0 | 1.46 |
| $e_i$ | 19 nm | 17 nm | 100 nm | 95 nm |

Comparative Example 8

This is laminated glazing as shown in FIG. 3, but without any antireflection coating.

Its structure is as follows:

→glass pane 6: glass bulk-tinted in the greens, having the reference $TSA^{3+}$ from Saint-Gobain Vitrage, and having the characteristics described in Patent EP 0 644 164 (the composition is very similar to that described in the last example of the said patent, but with a total iron content expressed in the form of $Fe_2O_3$ which is only 0.92% by weight) and a thickness of 2.1 mm;

sheet 7: 0.7 mm PVB sheet;

glass pane 6': clear Planilux glass 1.6 mm in thickness.

Example 9

This is the laminated glazing in FIG. 3, with the structure described in Comparative Example 8 and on the 4 face (conventionally, the faces of the glass panes making up glazing are numbered in ascending order increasing from the outside to the inside of the passenger compartment or the building in which the glazing is to be fitted), only a single antireflection stack according to the invention, the characteristics of which are given below: the objective here is to achieve the best compromise between reducing $R_L$ and obtaining a satisfactory colour in reflection on the "layers side" at oblique incidence (60°):

| EXAMPLE 9 | LAYER (1) | LAYER (2) | LAYER (3) | LAYER (4) |
|---|---|---|---|---|
| $n_i$ | 2.0 | 1.46 | 2.0 | 1.46 |
| $e_i$ | 19 nm | 17 nm | 100 nm | 95 nm |

Example 9a

This is the same glazing as in Example 9, except that here the glass pane 6 is thicker, having a thickness of 3.3 mm, so as to achieve a greater filtering effect with respect to solar radiation.

Example 10

This is the laminated structure shown in FIG. 3 and Example 8, with, on the 4 face, the stack A according to Example 9 and, on the 1 face, an antireflection coating 3 different from A and consisting of a layer of $SiO_xN_y$ whose refractive index decreases through its thickness in accordance with the teaching of the aforementioned patent FR98/16118 and which may be deposited by plasma CVD. Its thickness is about 260 nm.

Example 10a

This is the same glazing as in Example 9, except that here the glass pane 6 is thicker, having a thickness of 4.00 mm, in order to achieve a greater filtering effect with respect to solar radiation.

EXAMPLES 11 to 13

All these examples were actually produced on clear glass panes 6 of the Planilux type with a thickness of 2 mm in the case of Examples 11 and 12 and a thickness of 4 mm in the case of Example 13.

Example 11

The glass pane in accordance with FIG. 1 was coated, on one of its faces only, with the following antireflection stack according to the invention:

Glass$(^6)$/SnO$_2$$^{(1)}$/SiO$_2$$^{(2)}$/SnO$_2$ $^{(3)}$/SiO$_2$$^{(4)}$

| EXAMPLE 11 | LAYER (1) | LAYER (2) | LAYER (3) | LAYER (4) |
|---|---|---|---|---|
| $n_i$ | ≈2.05 | ≈1.46 | ≈2.05 | ≈1.46 |
| $e_i$ | 19 nm | 17 nm | 100 nm | 95 nm |

The $SiO_2$ layers contain in fact about 10% by weight of aluminium oxide so as to give them better durability, especially chemical durability.

The aim of this example is to lower the $R_L$ at 600 and to obtain negative values of a* and b* in reflection and for these to be, in absolute values, not very high in oblique reflection (again on the layers side).

Example 12

Compared with Example 11, the two $SnO_2$ layers have been substituted with two $Si_3N_4$ layers.

The sequence is therefore the following:

Glass $^{(6)}$/Si$_3$N$_4$$^{(1)}$/SiO$_2$$^{(2)}$/Si$_3$N$_4$$^{(3)}$/Sio$_2$$^{(4)}$

| EXAMPLE 12 | LAYER (1) | LAYER (2) | LAYER (3) | LAYER (4) |
|---|---|---|---|---|
| $n_i$ | ≈2.08 | ≈1.46 | ≈2.08 | ≈1.46 |
| $e_i$ | 19 nm | 17 nm | 100 nm | 95 nm |

The $SiO_2$ layers also contain about 10% aluminium oxide by weight.

Substituting $Si_3N_4$ for $SnO_2$ makes it possible for the stack to be bendable/toughenable. This means, within the context of the invention, that when the coated substrate undergoes a heat treatment of this type, its optical properties remain almost unchanged. Quantitatively, it may be estimated that there is no significant optical change in reflection when the value of $\Delta E=(\Delta L*^2+\Delta a*^2+\Delta b*2)$, which measures the variations in L*, a* and b* before and after heat treatment, remains less than 2.5 or better still, less than 2.

Example 13

The glazing according to this example is treated on both its faces. It is provided both on the 1 face and on the 2 face with the same stack, that used in Example 11 (alternatively, one or both of the $SnO_2$ layers may be replaced with $Si_3N_4$).

The table below gives for all the examples of the present patent the following photometric values:

$R_L(60°)$: the light reflection on the "layers side" at 60° with respect to the normal to the glazing, under illuminant $D_{65}$, in %;

a*(60°), b*(60°): the dimensionless calorimetric values of $R_L(60°)$;

$R_L(0°)$: the light reflection on the "layers side" at normal incidence, in %;

a*(0°), b*(0°): the dimensionless calorimetric values of $R_L$ at normal incidence;

$T_L(0°)$: the light transmission under illuminant $D_{65}$, in %.

| EXAMPLE | $R_L$ (60°) | a* (60°) | b* (60°) | $R_L$ (0°) | a* (0°) | b* (0°) | $T_L$ (0°) |
|---|---|---|---|---|---|---|---|
| 1 | 15.4 | −0.3 | −0.3 | 8.0 | −0.2 | −0.5 | 90.8 |
| 2 | 11.8 | 2.2 | −4.5 | 5.8 | 3.5 | −19.3 | 92.9 |
| 3 | 12.1 | −1.0 | −1.9 | 5.3 | −2.2 | −2.6 | 93.5 |
| 4 | 11.9 | 1.8 | −1.9 | 5.0 | 9.8 | −23.5 | 93.8 |
| 5 | 13.8 | 5.4 | −4.3 | 9.1 | 1.2 | −17.3 | 89.7 |
| 6 | 11.8 | 2.1 | −4.8 | 6.2 | −5.6 | −6.6 | 92.5 |
| 7 | 7.9 | −2.9 | −6.3 | 2.5 | −7.0 | −7.0 | 96.3 |
| 8 | 13.7 | −2.9 | 0.4 | 7.2 | −2.8 | 0.0 | 78.7 |
| 9 | 10.0 | −5.6 | −1.2 | 4.5 | −6.1 | −1.9 | 80.7 |
| 9a | 9.1 | −6.8 | −1.6 | 4.0 | −7.3 | −2.0 | 75.0 |
| 10 | 7.3 | −3.3 | −2.9 | 1.8 | −5.6 | −6.0 | 83.4 |
| 10a | 6.5 | −4.8 | −3.2 | 1.7 | −6.2 | −5.7 | 75.0 |
| 11 | 11.8 | −0.7 | −0.8 | 5.3 | −3.4 | −0.4 | 92.3 |
| 12 | 11.6 | −0.6 | −0.9 | 5.2 | −3.7 | −7.1 | 94.0 |
| 13 | 7.7 | −0.6 | −2.1 | 2.3 | −3.7 | −7.1 | 95.3 |

Examples 11 and 12 underwent a mechanical durability test, the TABER test consisting in subjecting the substrate on its face coated with the layers to a circular rubbing action by abrasive grinding mills with a load of 500 grams. After 650 revolutions, the observed difference in haze AH was 1.6 in the case of Example 12 and only 0.5 in the case of Example 13.

This confirms that the stacks according to the invention, even when deposited by sputtering, have a satisfactory durability which is further enhanced if preference is given to $Si_3N_4$ rather than to $SnO_2$ for making all or some of the high-index layers.

From the summarizing table of the photometric for all of the examples, it is possible to make following comments:

once the refracted indices have been selected, the geometrical thicknesses of the layers may be adjusted according to whether the $R_L$ or the colorimetric response is emphasized: comparing Examples 2 and 3, it may be seen that the $R_L$ at 60° may go below the 12% level, but with a positive a*(Example 2), for a clear glass substrate coated especially on only one face, or else to have a slightly higher $R_L$ value but offset by being certain of having a* and b* values at 60° which are more negative;

Example 4 allows both the $R_L$ at 60° to go below the 12% level and the $R_L$ at 0° to reach 5%. This may be beneficial when the application is for glass of the counter type, which is liable to be observed at very varied angles of incidence.

According to the invention, $R_L$ at oblique incidence may go below 8% if the glass is provided with antireflection stacks on both its faces (Example 7);

Comparative Examples 5 and 6 show the advantage of using $SnO_2$ or $Si_3N_4$ rather than $TiO_2$ as the high-index layer: Example 5 tries to reproduce, in optical thickness, Example 2 (the optical thickness of layer 3 is 180 nm in both cases), but the result is less good: the $R_L$ at 60° is 13.8%. Example 6 shows that better $R_L$ values at 60° may be achieved, but at the expense of greatly thickening the layer 3 (optical thickness of 264 nm), which is not satisfactory in terms of production efficiency;

The examples of laminated glazing confirm the benefit of providing car windscreens with antireflection coatings according to the invention;

A reduction of more than 6% in $R_L$ at 60° is achieved for a windscreen treated on both faces with the stack of the invention deposited on the 4 face (Example 10) as compared with a standard windscreen (Example 8). This therefore makes it possible either to increase the level of light transmission or to use darker or thicker glass, and therefore to provide better heat protection for the passengers in the vehicle, while still exceeding the 75% level for TL; this is shown by Examples 10 and 10a on the one hand, and Examples 9 and 9a on the other;

Examples 11 to 13 confirm the modelled results: as compared with the bare glass of Example 1, the $R_L$ at 60° is thus reduced by at least 3%, almost 4%, while managing to keep the corresponding a* and b* values negative and, in absolute value, at most 2.1 (and even at most 1 in absolute value in the case of a*). The effect is even more pronounced if the glass is treated on both its faces, when there is a drop of more than 7% in the $R_L$ at 60°. Furthermore, in all cases, there is also an appreciable reduction in the $R_L$ at normal incidence (about 3% per treated face), again with negative a* and b* values: a person viewing the glazing over a wide range of angles of incidence will therefore see glazing which reflects little and does not "switch" from one colour to the other in reflection depending on the way in which he looks at it, this being highly advantageous.

Example 14

This example relates to a stack according to the invention having only three layers, the first two layers 1, 2 being replaced with a single layer 5, as shown in FIG. 1.

The substrate is a clear Planilux glass 2 mm in thickness, treated on only one of its faces. The stack is as follows:

Glass/60 nm $SiO_xN_y$(n=1.70)/100 nm $Si_3N_4$/95 nm, $SiO_2$.

The photometric data of the coated glass are as follows:

$R_L(60°)$=12.1% a*=−0.3 b*=−1.2;

$R_L(0°)$=5.3% a*=−2.9 b*=−5.0;

$T_L(0°)$=93.5%.

It is thus possible to achieve with three layers similar performance to that of a four-layer antireflection stack according to the invention: the calorimetric response in reflection at 600 and 0° is satisfactory. The durability, especially mechanical durability, of the three-layer stack is moreover at least equivalent, if not better, than that of the four-layer stack of the invention using at least one $Si_3N_4$ layer.

Example 15

This example relates to laminated glazing with the ($Si_3N_4$ $SiO_2/Si_3N_4/SiO_2$) antireflection stack according to the invention on the 4 face and, between the two joining PVB sheets, a PET sheet functionalized by the (indium oxide/Ag/indium oxide/Ag/indium oxide) solar-protection coating.

The sequence is as follows:

Planilux glass (2.1 mm)/PVB (380 microns)/PET (160 microns)/$In_2O_3$ (20 nm)/Ag (7 nm)/$In_2O_3$ (60 nm)/Ag (7 nm)/$In_2O_3$ (20 nm)/PVB (380 microns)/Planilux glass (2.1 mm)/$Si_3N_4$ (17 nm)/$SiO_2$ (18 nm)/$Si_3N_4$ (104 nm)/$SiO_2$ (108 nm).

The value of the light reflection at 60°, RL (600), is 11.2%, whereas it is 14.9% if it is measured on laminated glazing which is identical but does not have the antireflection coating on the 4 face.

The value of $T_L$ at 0° is 75.1% (it is 75.3% without the antireflection coating).

The value of the energy reflection at 0° (normal incidence), RE (0°), is 25.6% and the energy transmission value at 0°, $T_E$ (0°), is 52.2%.

This example shows the effectiveness of a solar-protection coating which significantly reflects the infrared. However, against this, the use of such a coating tends to increase the light reflection on the interior side. The antireflection stack according to the invention makes it possible to compensate for this increase in reflection and to maintain the level of reflection (on the inside) that the laminated glazing would have without the solar-protection coating.

The same solar-protection effect is obtained if a coating comprising two silver layers, deposited directly on one of the glass panes, with a single intermediate PVB sheet, is used.

What is claimed is:

1. A manufactured article, comprising:
   a transparent substrate;
   an antireflection coating on at least one face of the transparent substrate, said antireflection coating made of a stack of thin layers of dielectric material having alternately high and low refractive indices, wherein the stack comprises, in succession:
   a high-index first layer, having a refractive index $n_1$ of between 1.8 and 2.2 and a geometrical thickness $e_1$ of between 5 and 50 nm;
   a low-index second layer, having a refractive index $n_2$ of between 1.35 and 1.65 and a geometrical thickness $e_2$ of between 5 and 50 nm;
   a high-index third layer, having a refractive index $n_3$ of between 1.8 and 2.2 and a geometrical thickness $e_3$ of between 70 and 120 nm;
   a low-index fourth layer, having a refractive index $n_4$ of between 1.35 and 1.65 and a geometrical thickness $e_4$ of at least 80 $\mu$m,
   wherein the antireflection stack uses, at least for its high-index third layer, silicon nitride or aluminium nitride to undergo a heat treatment of bending, toughening, or annealing.

2. The manufactured article according to claim 1, wherein $n_1$ and/or $n_3$ are between 1.85 and 2.15.

3. The manufactured article according to claim 1, wherein $n_2$ and/or $n_4$ are between 1.35 and 1.55.

4. The manufactured article according to claim 1, wherein $e_1$ is between 10 and 30 nm.

5. The manufactured article according to claim 1, wherein $e_2$ is between 10 and 35 nm.

6. The manufactured article according to claim 1, wherein $e_3$ is between 70 and 75 Nm.

7. The manufactured article according to claim 1, wherein $e_4$ is greater than or equal to 80 nm and less than or equal 120 nm.

8. The manufactured article according to claim 1, wherein the high-index first layer and/or the high-index third layer are based on one or more metal oxides chosen from zinc oxide, tin oxide, and zirconium oxide, or based on one or more nitrides chosen from silicon nitride and aluminium nitride.

9. The manufactured article according to claim 1, wherein the high-index first layer and/or the high-index third layer include a superposition of several high-index layers.

10. The manufactured article according to claim 1, wherein the low-index second layer and/or the low-index fourth layer are based on at least one of a silicon oxide, silicon oxynitride and/or oxycarbide, or on a mixed silicon aluminium oxide.

11. The manufactured article according to claim 1, wherein the substrate is made of clear or bulk-tinted glass.

12. The manufactured article according to claim 1, wherein light reflection on a side where the stack of thin layers is provided is reduced by a minimum value of 3 or 4% at an angle of incidence of between 50 and 70 degrees.

13. The manufactured article according to claim 1, wherein a calorimetric response of light reflection on a side where the stack of thin layers is provided is such that corresponding a* and b* values in the (L*, a*, b*) colorimetry system are negative at an angle of incidence of between 50 and 70 degrees.

14. A glazing including the manufactured article according to claim 1, wherein the glazing comprises the transparent substrate provided, on a second face opposed to the at least one face either with no antireflection stack or with a multilayer antireflection stack, or with another type of antireflection coating, or with a coating having another functionality of solar-protection, low-emissivity, antifouling, antifogging, anti-rain, or heating.

15. A glazing including the manufactured article according to claim 1, comprising:
   a laminated structure in which the transparent substrate and a second transparent substrate are joined together using a sheet of thermoplastic, the second transparent substrate being provided, on the opposite side to the sheet of thermoplastic, either with no antireflection coating, or also with an antireflection stack, or with another type of antireflection coating, or with a coating having another functionality of the solar-protection, low-emissivity, antifouling, antifogging, anti-rain, or heating, the coating having another functionality possibly also being on one of the faces of the substrates which are turned towards the thermoplastic joining sheet.

16. A glazing including the manufactured article according to claim 1, further comprising: a laminated structure with one or more sheets of joining polymer, wherein the antireflection coating is disposed on at least one of the faces on the opposite side to the one or more sheets of joining polymer, and a solar-protection-coating is in contact with the one or more sheets of joining polymer.

17. A glazing including the manufactured article according to claim 14, wherein the another type of antireflection coating is present and includes one of the following coatings:
   a single low-index layer, having an index of less than 1.60;
   a single layer whose refractive index varies through its thickness, including silicon oxynitride $SiO_xN_y$, where x and y vary through its thickness;
   a two-layer stack, comprising, in succession, a layer having a high index of at least 1.8 including at least one of tin oxide, zinc oxide, zirconium oxide, titanium oxide, silicon nitride or aluminium nitride, and then a layer having a low index, of less than 1.65, including at least one of silicon oxide, oxynitride, or oxycarbide;
   a three-layer stack comprising, in succession, a layer having a medium index of between 1.65 and 1.8 including silicon oxycarbide or oxynitride and/or aluminium oxycarbide or oxynitride, a layer having a high index of greater than 1.9 including $SnO_2$ or $TiO_2$, and a layer having a low index of less than 1.65, including mixed Si—Al oxide or silicon oxide.

18. A method of making the glazing according to claim 14, including the steps of depositing the antireflection stack or stacks by sputtering and depositing the optional antireflection coating by a sol-gel technique, by a pyrolysis technique of CVD or plasma CVD, by sputtering, or by corona discharge.

19. A method of using the glazing according to claim 14 including using the glazing as an interior or exterior glazing for buildings, as a planar or curved shop display cabinet or counter glazing, as a glazing for a vehicle side window, as a glazing for a vehicle rear window, as a glazing for a vehicle sunroof, as a glazing for a vehicle windscreen, as a glazing for protecting a painting, as a glazing for an antidazzle computer screen, or as a glazing for glass furniture.

20. A manufactured article comprising:
a transparent substrate;
an antireflection coating on at least one face of the transparent substrate having a stack of thin layers of dielectric material, wherein the stack comprises, in succession:
a high-index first layer, having a refractive index $n_1$ of between 1.8 and 2.2 and a geometrical thickness $e_1$ of between 5 and 50 nm;
a low-index second layer having a refractive index $n_2$ of between 1.35 and 1.65 and a geometrical thickness $e_2$ of between 5 and 50 rim;
a high-index third layer having a refractive index $n_3$ of between 1.8 and 2.2 and a geometrical thickness $e_3$ of between 70 and 120 nm;
a low-index fourth layer having a refractive index $n_4$ of between 1.35 and 1.65 and a geometrical thickness $e_4$ of at least 80 nm,
wherein the stack is configured to reduce light reflection by at least 3% at an angle of incidence of between 50 and 70 degrees, and
wherein the stack is configured to produce a colorimetric response of light reflection on a side where the stack of thin layers is provided such that corresponding a* and b* values in the (L*, a*, b*) colorimetry system are negative at an angle of incidence of between 50 and 70 degrees.

21. The manufactured article according to claim 20, wherein $n_1$ and/or $n_3$ are between 1.85 and 2.15.

22. The manufactured article according to claim 20, wherein $n_2$ and/or $n_4$ are between 1.35 and 1.55.

23. The manufactured article according to claim 20, wherein $e_1$ is between 10 and 30 nm.

24. The manufactured article according to claim 20, wherein $e_2$ is between 10 and 35 nm.

25. The manufactured article according to claim 20, wherein $e_3$ is between 70 and 75 nm.

26. The manufactured article according to claim 20, wherein $e_4$ is greater than or equal to 80 nm and less than or equal to 120 nm.

27. The manufactured article according to claim 20, wherein the high-index first layer and/or the high-index third layer are based on one or more metal oxides chosen from zinc oxide, tin oxide, and zirconium oxide, or based on one or more nitrides chosen from silicon nitride and aluminium nitride.

28. The manufactured article according to claim 20, wherein the high-index first layer and/or the high-index third layer include a superposition of several high-index layers.

29. The manufactured article according to claim 20, wherein the low-index second layer and/or the low-index fourth layer are based on silicon oxide, silicon oxynitride and/or oxycarbide, or on a mixed silicon aluminium oxide.

30. The manufactured article according to claim 20, wherein the substrate is made of clear or bulk-tinted glass.

31. A glazing including the manufactured article according to claim 20, wherein the glazing comprises the transparent substrate provided on a second face opposed to the at least one face either with no antireflection stack or with a multilayer antireflection stack, or with another type of antireflection coating, or with a coating having another functionality of solar-protection, low-emissivity, antifouling, antifogging, anti-rain, or heating.

32. A glazing including the manufactured article according to claim 20, comprising:
a laminated structure in which the transparent substrate and a second transparent substrate are joined together using a sheet of thermoplastic, the second transparent substrate being provided on the opposite side to the sheet of thermoplastic, either with no antireflection coating, or also with an antireflection stack, or with another type of antireflection coating, or with a coating having another functionality of the solar-protection, low-emissivity, antifouling, antifogging, anti-rain, or heating, the coating having another functionality possibly also being on one of the faces of the substrates which are turned towards the thermoplastic joining sheet.

33. A glazing including the manufactured article according to claim 20, further comprising: a laminated structure with one or more sheets of Joining polymer, wherein the antireflection coating is disposed on at least one of the faces on the opposite side to the one or more sheets of joining polymer, and a solar-protection-coating is in contact with the one or more sheets of joining polymer.

34. A glazing including the manufactured article according to claim 31, wherein the another type of antireflection coating is present and includes one of the following coatings:
a single low-index layer, having an index of less than 1.60;
a single layer whose refractive index varies through its thickness, silicon oxynitride $SiO_xN_y$, where x and y vary through its thickness;
a two-layer stack, comprising, in succession, a layer having a high index of at least 1.8 including at least one of tin oxide, zinc oxide, zirconium oxide, titanium oxide, silicon nitride or aluminium nitride, and then a layer having a low index, of less than 1.65, including at least one of silicon oxide, oxynitride, or oxycarbide;
a three-layer stack comprising, in succession, a layer having a medium index of between 1.65 and 1.8 including silicon oxycarbide or oxynitride and/or aluminium oxycarbide or oxynitride, a layer having a high index of greater than 1.9 including $SnO_2$ or $TiO_2$, and a layer having a low index of less than 1.65, including mixed Si—Al oxide or silicon oxide.

35. A method of making the glazing according to claim 31;
including the steps of depositing the antireflection stack or stacks by sputtering and depositing the optional antireflection coating by a sol-gel technique, by a pyrolysis technique of CVD or plasma CVD, by sputtering, or by corona discharge.

36. A method of using the glazing according to claim 31 including using the glazing as an interior or exterior glazing for buildings, as a planar or curved shop display cabinet or counter glazing, as a glazing for a vehicle side window, as a glazing for a vehicle rear window, as a glazing for a vehicle sunroof, as a glazing for a vehicle windscreen, as a glazing for protecting a painting, as a glazing for an antidazzle computer screen, or as a glazing for glass furniture.

37. A manufactured article, comprising:

a transparent substrate;

an antireflection coating on at least one face of the transparent substrate, said antireflection coating made of a stack of thin layers of dielectric material having alternately high and low refractive indices, wherein the stack comprises, in succession:

a high-index first layer, having a refractive index $n_1$ of between 1.8 and 2.2 and a geometrical thickness $e_2$ of between 5 and 50 nm;

a low-index second layer, having a refractive index $n_2$ of between 1.35 and 1.65 and a geometrical thickness $e_2$ of between 5 and 50 nm;

a high-index third layer, having a refractive index $n_3$ of between 1.8 and 2.2 and a geometrical thickness $e_3$ of between 70 and 120 nm;

a low-index fourth layer, having a refractive index $n_4$ of between 1.35 and 1.65 and a geometrical thickness $e_4$ of at least 80 nm, wherein the antireflection stack uses silicon nitride or aluminium nitride for at least one of the high-index layers to undergo a heat treatment of bending, toughening, or annealing.

* * * * *